Patented Mar. 15, 1938

2,111,395

UNITED STATES PATENT OFFICE 2,111,395

RESIN FILM FOR COATING BARRELS AND SIMILAR ARTICLES

Otto J. Hartwick, Milwaukee, Wis., assignor to Pittsburgh Plate Glass Company, a corporation of Pennsylvania No Drawing. Application August 28, 1934, Serial No. 741,825

8 Claims. (Cl. 91—68)

My invention relates to coating material for containers or similar articles where the characteristics of durability and neutral action upon other ingredients are especially desirable.

The recent practice of utilizing steel barrels for containing beer has created the need for a coating material having unusual characteristics. Ordinary paint or lacquer does not serve the purpose because of the reaction that occurs between the coating and the ingredients of the beer. Moreover, a coating for this purpose must be capable of being applied by flowing and dried by baking to a tough resistant film of great durability. The properties required in coating beer barrels are likewise desirable in finishing fruit and vegetable containers. My invention comprehends, therefore, the provision of a coating material that will be especially suitable for such service. Its inherent properties will, of course, adapt it for other applications.

It has been found that a carefully selected resin or combination of resins affords a desirable base for a coating material of the character designated. This resin base coating requires baking at 300°–350° F. to secure optimum results in service. A metallic oxide is employed as a pigment and stabilizer. In order to provide freely flowing material it is desirable to utilize carefully selected solvents and diluents. Plasticizers are employed to control flexibility.

A preferred pigment is antimony oxide, but others may be used, or combinations may be substituted. For example, titanium oxide may be employed in conjunction with the antimony oxide. Useful chemical plasticizers include butylcellosolvephthalate, dibutylphthalate, tricresylphosphate. Suitable solvents are acetone, methylethylketone, methylisobutylketone and dipropylketone. Various well known diluents may be utilized, such as toluol, xylol, carbon tetrachloride.

It has been determined that a mixture of two resins affords very satisfactory results. For example, a resin (A) formed of chlorinated diphenyl may be advantageously mixed with a resin (B) constituting a condensation product of vinyl acetate and vinyl chloride. A suitable example of resin (B) is a condensation product comprising 87% vinyl chloride and 13% vinyl acetate.

Varying quantities of the foregoing materials may be mixed to afford a satisfactory coating material. For satisfactory results a very intimate dispersion of the pigment and stabilizer in the thoroughly mixed resins plus plasticizer is essential. This cannot be readily accomplished on the usual paint mixing machinery. A satisfactory machine for this purpose is the two-roll rubber compounding mill. Other powerful mixers or dispersing machines may be used. A typical example is as follows:

| | Lbs. |
|---|---|
| Titanium oxide | 77 |
| Antimony oxide | 51.84 |
| Resin (B) | 104.56 |
| Resin (A) | 83.9 |
| Plasticizer | 8.5 |
| Total solids | 325.8 |

This compound of materials is then mixed with a solvent or solvent blend, such as a combination of methylisobutylketone, dipropylketone and toluol. A sufficient quantity of the solvent is added to secure any desired state of viscosity in order that the coating may be sprayed, applied by flowing, or the like. Optimum results in adhesion and flexibility of the coating are assured if it is baked at a temperature from 300° F. to 350° F.

The addition of finely divided aluminum powder as an ingredient of the above formula serves to further stabilize the baked coating and also has a useful effect in assisting in the uniform application of the coating.

Finely divided metallic copper may be employed as a stabilizing pigment in combination with or instead of the antimony oxide in the above formula. Further examples of coatings made and tested are as follows:

Steel barrel coating

| | Lbs. |
|---|---|
| Fine aluminum powder | 63 |
| Antimony oxide | 129 |
| Titanium oxide | 62 |
| Resin (B) | 143½ |
| Resin (A) | 140 |
| Butylcellosolvephthalate | 35 |
| Total | 572½ |

Steel barrel coating

| | Lbs. |
|---|---|
| Fine aluminum powder | 63 |
| Titanium oxide | 130 |
| Fine copper powder | 18 |
| Resin (B) | 150 |
| Resin (A) | 140 |
| Butylcellosolvephthalate | 35 |
| Total | 536 |

*White refrigerator enamel—White tile coating*

| | Lbs. |
|---|---|
| Antimony oxide | 66 |
| Titanium oxide | 96 |
| Resin (B) | 138 |
| Resin (A) | 105 |
| Butylcellosolvephthalate | 10½ |
| Total | 415½ |

Although I have described preferred formulas of ingredients to provide coating materials, it will be obvious that variations may be made therein without departing from the inventive concept and I desire, therefore, that only such limitations be imposed as are set forth in the appended claims.

What I claim is:

1. A chemically inert coating material for lining metallic containers of alcoholic beverages consisting of from 23 to 27 per cent of a chlorinated diphenyl resin, from 25 to 33 per cent of a resin constituting a condensation product of vinyl acetate and vinyl chloride in the proportions of about 87 per cent of vinyl chloride to about 13 per cent of vinyl acetate, from 24 to 40 per cent of inert metallic oxide pigment, from 11 to 15 per cent of a powder of a metal selected from a group consisting of copper and aluminum, from 2 to 7 per cent of a plasticizer, and an inert volatile solvent for the resins.

2. A chemically inert coating material for lining metallic containers of alcoholic beverages consisting of 11.75 per cent of aluminum powder, 3.36 per cent of copper powder, 24.25 per cent of titanium oxide, 26.12 per cent of a chlorinated diphenyl resin, 27.98 per cent of a resin constituting a condensation product of vinyl acetate and vinyl chloride in the proportions of about 87 per cent of vinyl chloride and about 13 per cent of vinyl acetate, and 6.54 per cent of butyl cellosolve-phthalate.

3. An article consisting mainly of metallic iron and having a coating consisting of chlorinated diphenyl resin admixed with a resin obtained by polymerizing a mixture of vinyl chloride and vinyl acetate, the vinyl chloride being in preponderance.

4. An article as defined in claim 3, in which the resin is admixed with a powder of a metal which is substantially non-reactive with water at atmospheric temperatures.

5. An article as defined in claim 3, in which the coating is further admixed with an inert oxide pigment.

6. An article as defined in claim 3, in which the coating material is admixed with a powdered metal selected from a group consisting of aluminum and copper.

7. A method of preventing contamination of beer and similar food products in containers consisting essentially of ferrous metal which comprises coating the containers preliminary to the introduction of the beer with a composition comprising a co-polymer of vinyl acetate and vinyl chloride admixed with chlorinated diphenyl resin.

8. A method as defined in claim 7 in which the coating composition is further admixed with metallic aluminum in finely divided form.

OTTO J. HARTWICK.